United States Patent
Sakakibara

(10) Patent No.: US 9,937,768 B2
(45) Date of Patent: Apr. 10, 2018

(54) AIR CONDITIONING DEVICE FOR VEHICLE

(71) Applicant: DENSO CORPORATION, Kariya, Aichi-pref. (JP)

(72) Inventor: Daisuke Sakakibara, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 307 days.

(21) Appl. No.: 14/897,594

(22) PCT Filed: Jun. 3, 2014

(86) PCT No.: PCT/JP2014/002918
§ 371 (c)(1),
(2) Date: Dec. 10, 2015

(87) PCT Pub. No.: WO2014/199588
PCT Pub. Date: Dec. 18, 2014

(65) Prior Publication Data
US 2016/0137022 A1 May 19, 2016

(30) Foreign Application Priority Data
Jun. 14, 2013 (JP) ................................ 2013-125965

(51) Int. Cl.
*B60H 1/00* (2006.01)
*B60H 1/22* (2006.01)

(52) U.S. Cl.
CPC ..... *B60H 1/00035* (2013.01); *B60H 1/00064* (2013.01); *B60H 1/00564* (2013.01); *B60H 1/2215* (2013.01); *B60H 2001/00092* (2013.01)

(58) Field of Classification Search
CPC ............ B60H 1/00025; B60H 1/00028; B60H 1/00092
(Continued)

(56) References Cited

U.S. PATENT DOCUMENTS

| 2006/0060341 A1 | 3/2006 | Maehata |
| 2006/0116061 A1* | 6/2006 | Alberternst ........ B60H 1/00064 |
| | | 454/2 |

(Continued)

FOREIGN PATENT DOCUMENTS

| DE | 10161751 A1 * | 6/2003 | ......... B60H 1/00028 |
| JP | S58008420 A | 1/1983 | |

(Continued)

OTHER PUBLICATIONS

International Search Report and Written Opinion (in Japanese with English Translation) for PCT/JP2014/002918, dated Sep. 2, 2014; ISA/JP.

*Primary Examiner* — Allen Flanigan
(74) *Attorney, Agent, or Firm* — Harness, Dickey & Pierce, P.L.C.

(57) ABSTRACT

An air conditioning device for vehicle has guide plates that guide a flow of air on a downstream side of a heating heat exchanger. In order to form a first path, the guide plates have a first guide that extends from a downstream wall surface of the heating heat exchanger and bends in an upward direction. Further, in order to hold a heat exchanger other than a cooling heat exchanger and the heating heat exchanger, the guide plates have a second guide that extends from an upper end part of the heating heat exchanger and bends in a downward direction. Furthermore, the guide plates have a third guide that extends from the first guide toward an end of the second guide.

9 Claims, 7 Drawing Sheets

(58) Field of Classification Search
USPC .................................. 165/42, 202, 203, 204
See application file for complete search history.

(56) References Cited

U.S. PATENT DOCUMENTS

| | | | |
|---|---|---|---|
| 2007/0017655 A1* | 1/2007 | Mouri | B60H 1/0005 |
| | | | 165/42 |
| 2011/0117829 A1* | 5/2011 | Ikeda | B60H 1/00064 |
| | | | 454/155 |
| 2012/0255319 A1 | 10/2012 | Itoh et al. | |
| 2013/0008627 A1 | 1/2013 | Uemura | |

FOREIGN PATENT DOCUMENTS

| | | | | |
|---|---|---|---|---|
| JP | H05058143 A | 3/1993 | | |
| JP | 2004224180 A | 8/2004 | | |
| JP | 2006103664 A | 4/2006 | | |
| JP | 2006264382 A | 10/2006 | | |
| JP | 2007015650 A | 1/2007 | | |
| JP | 2007203888 A | 8/2007 | | |
| JP | 2013002710 A | 1/2013 | | |
| JP | 2013014284 A | 1/2013 | | |
| JP | 2013024437 A | 2/2013 | | |
| JP | 2014080103 A | 5/2014 | | |
| WO | WO 2012023560 A1 * | 2/2012 | ......... | B60H 1/00028 |

\* cited by examiner

US 9,937,768 B2

AIR CONDITIONING DEVICE FOR VEHICLE

CROSS REFERENCE TO RELATED APPLICATIONS

This application is a U.S. National Phase Application under 35 U.S.C. 371 of International Application No. PCT/JP2014/002918 filed on Jun. 3, 2014 and published in Japanese as WO 2014/199588 A1 on Dec. 18, 2014. This application is based on and claims the benefit of priority from Japanese Patent Application No. 2013-125965 filed on Jun. 14, 2013. The entire disclosures of all of the above applications are incorporated herein by reference.

TECHNICAL FIELD

The present disclosure relates to an air conditioning device for vehicle, provided with a heating heat exchanger that is installed inside an air conditioning case and heats cold air from an evaporator. More particularly, the present disclosure relates to an air conditioning device for vehicle that restricts unintended heating of the cold air by a downstream wall surface of the heating heat exchanger when the cold air flows above the heating heat exchanger with bypassing the heating heat exchanger.

BACKGROUND ART

Patent Document 1 describes an air conditioning device for vehicle. The described device passes cold air from an evaporator to a heating heat exchanger side under the control of a first air mixing door and a second air mixing door, both of which are formed of sliding doors.

The cold air from each air mixing door is split to air passing through an interior of the heating heat exchanger, and air passing above the heating heat exchanger (vehicle ceiling direction) and air passing under the heating heat exchanger (vehicle floor direction) by bypassing the heating heat exchanger. The three types of split air are blown into a vehicle compartment from a defroster outlet toward a windshield, a face outlet toward a face of an occupant, and a foot outlet toward foot of the occupant.

According to the technique of Patent Document 1, air passing above the heating heat exchanger (vehicle ceiling direction) flows around to a downstream side of the heating heat exchanger and is heated by a downstream wall surface of the heating heat exchanger in some cases. Such heating may possibly give rise to a fluctuation of a temperature of air conditioning air blown into the vehicle compartment.

In the air conditioning device for vehicle of Patent Document 1 adopting an inside and outside air bi-level structure, in particular, a bypass cold air passage is split to an upper direction and a lower direction with the heat exchanger in between. Hence, when an interior of the vehicle compartment is cooled to a maximum extent from the face outlet, that is, during so-called FACE mode Max Cool, a large volume of bypass air passing above the heating heat exchanger (vehicle ceiling direction) may possibly flow into a space on a downstream surface side of the heating heat exchanger. Consequently, a large volume of air that has flowed into the space on the downstream surface side of the heating heat exchanger readily exchanges heat with the downstream wall surface of the heating heat exchanger.

PRIOR ART DOCUMENT

Patent Document

Patent Document 1: JP 2013-14284 A

SUMMARY OF THE INVENTION

It is an objective of the present disclosure to provide an air conditioning device for vehicle capable of restricting air that has flowed out from a cooling heat exchanger from flowing around to a downstream wall surface of a heating heat exchanger.

The content described in Patent Literature cited as the prior art is hereby incorporated herein by reference as a description of technical elements described herein.

According to an aspect of the present disclosure, an air conditioning device for a vehicle includes a cooling heat exchanger that cools an inside air which is an air inside a vehicle compartment and an outside air which is an air outside the vehicle compartment, a heating heat exchanger that is disposed downstream of the cooling heat exchanger in an airflow direction, an air mixing door that is disposed between the cooling heat exchanger and the heating heat exchanger and adjusts a degree of heating of a cold air in the heating heat exchanger by controlling a flow of the cold air that has passed through the cooling heat exchanger, an outlet from which an air adjusted in temperature by the air mixing door is blown out to the vehicle compartment, an airflow regulation wall that is disposed downstream of the heating heat exchanger in the airflow direction and introduces an air that has flowed out of the heating heat exchanger to the outlet, a first path along which the cold air that has flowed out of the cooling heat exchanger reaches the outlet with passing through an interior of the heating heat exchanger according to the control of airflow by the air mixing door, and a second path along which the cold air that has flowed out of the cooling heat exchanger reaches the outlet from above the heating heat exchanger without passing through the interior of the heating heat exchanger according to the control of a flow of air by the air mixing door. The airflow regulation wall includes guide plates that guide a flow of air on a downstream side of the heating heat exchanger. The guide plates include a first guide that extends from a downstream wall surface of the heating heat exchanger to a downstream side in the airflow direction and bends to extend in an upward direction so as to guide an air to the outlet by letting the air flow in the upward direction from the downstream side of the heating heat exchanger along the first path, a second guide that extends from an upper end part of the heating heat exchanger to the downstream side in the airflow direction and bends to extend in a downward direction, and a third guide that extends from the first guide toward an end of the second guide. A distance between an end of the first guide and the downstream wall surface of the heating heat exchanger is longer than a distance between the end of the second guide and the downstream wall surface of the heating heat exchanger.

The air conditioning device for vehicle has the first path and the second path as a path along which air flows. Along the first path, an airflow of cold air that has flowed out from the cooling heat exchanger is controlled by the air mixing door to pass through the interior of the heating heat exchanger. Air heated in the heating heat exchanger reaches the outlet with flowing in the upward direction from the downstream side of the heating heat exchanger. Along the second path, an airflow of cold air that has flowed out from the cooling heat exchanger is controlled by the air mixing door to reach the outlet from above the heating heat exchanger without passing through the interior of the heating heat exchanger (i.e., with bypassing the heating heat exchanger).

The air conditioning device for vehicle is provided with the guide plates that have influences on a flow of air on the downstream side of the heating heat exchanger. In order to form the first path, the guide plates have the first guide that extends from the downstream wall surface of the heating heat exchanger to the downstream side and bends in the upward direction. Hence, heated air that has flowed out from the interior of the heating heat exchanger is introduced to the first path.

Further, in order to hold another heat exchanger, the guide plates have the second guide that extends from the upper end part of the heating heat exchanger to the downstream side and bends in the upward direction. An end of the first guide is provided farther from the heating heat exchanger than an end of the second guide.

Hence, air flows in from a space between the end of the first guide and the end of the second guide and contact heating air that is heated upon contact with the downstream wall surface of the heating heat exchanger is generated.

In order to restrict the contact heating air, the guide plates have the third guide that extends from the first guide toward the end of the second guide. Consequently, the generation of the contact heating air is restricted and hence a fluctuation of a temperature of air conditioning air can be restricted.

In the air conditioning device for vehicle of the present disclosure, a dimension from an end of the third guide to the end of the second guide is given as a dimension A and a dimension from the end of the first guide to the end of the second guide is given as a dimension B. The dimension A may be set in a range 0.7 to 1.3 times longer than the dimension B.

Because the dimension A is set in a range 0.7 to 1.3 times longer than the dimension B, the first path and the second path can be formed while restricting the generation of the contact heating air.

In the air conditioning device for vehicle, a relation of the dimension A and the dimension B as to which is larger than which may be expressed as: B≤A. The dimension A and the dimension B regulate dimensions of inlet and outlet ports of a flow of air. Outgoing air is air that passes along the first path K1. Meanwhile, incoming air is air that flows in from a space between the end of the first guide and the end of the second guide. The inflow air turns to the contact heating air that is heated upon contact with the downstream wall surface of the heating heat exchanger. When the dimension A is smaller than the dimension B (A<B), ventilation resistance is generated against a flow of air passing along the first path. Hence, an air volume is reduced and a preferable air volume ratio cannot be obtained. Moreover, blown air noise may become louder. However, by setting the relation of the dimension A and the dimension B as to which is larger than which to be expressed as: B≤A, a reduction in air volume and blown air noise can be restricted.

According to another aspect of the present disclosure, an air conditioning device for a vehicle includes a cooling heat exchanger that cools an inside air which is an air inside a vehicle compartment and an outside air which is an air outside the vehicle compartment, a heating heat exchanger that is disposed downstream of the cooling heat exchanger in an airflow direction, an air mixing door that is disposed between the cooling heat exchanger and the heating heat exchanger and adjusts a degree of heating of a cold air in the heating heat exchanger by controlling a flow of the cold air that has passed through the cooling heat exchanger, an outlet from which an air adjusted in temperature by the air mixing door is blown out to the vehicle compartment, an airflow regulation wall that is disposed downstream of the heating heat exchanger in the airflow direction and introduces an air that has flowed out of the heating heat exchanger to the outlet, a first path along which the cold air that has flowed out of the cooling heat exchanger reaches the outlet with passing through an interior of the heating heat exchanger according to the control of airflow by the air mixing door, a second path along which the cold air that has flowed out of the cooling heat exchanger reaches the outlet from above the heating heat exchanger without passing through the interior of the heating heat exchanger according to the control of a flow of air by the air mixing door, and a direction changing portion that changes a flow direction of the cold air in the second path from a direction toward the heating heat exchanger in the first path to a direction toward the outlet. The airflow regulation wall has guide plates that guide a flow of air on a downstream side of the heating heat exchanger. The guide plates include a first guide that extends from a downstream wall surface of the heating heat exchanger to a downstream side in the airflow direction and bends to extend in an upward direction so as to guide an air to the outlet by letting the air flow in the upward direction from the downstream side of the heating heat exchanger along the first path, a second guide that extends from an upper end part of the heating heat exchanger to the downstream side in the airflow direction and bends to extend in a downward direction, and a third guide that extends from the first guide toward an end of the second guide. A distance between an end of the first guide and the downstream wall surface of the heating heat exchanger is longer than a distance between the end of the second guide and the downstream wall surface of the heating heat exchanger. The direction changing portion is formed of the first guide and the third guide and includes a space defined by the first guide and the third guide. The direction changing portion changes the flow direction of the cold air that has flowed into the space from the second path along the second guide to toward the outlet.

EMBODIMENTS FOR EXPLOITATION OF THE INVENTION

Figure 1A:
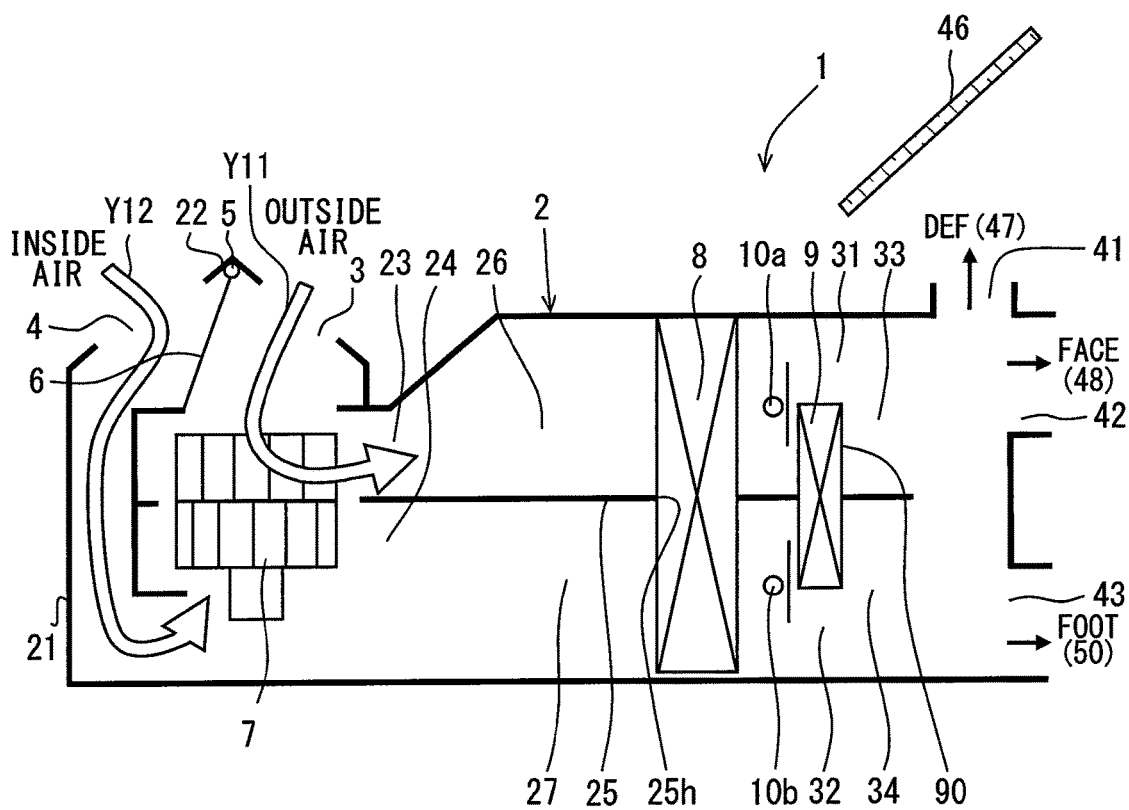
FIG. 1A is a schematic diagram of an air conditioning device for vehicle according to a first embodiment of the present disclosure.
Figure 1B:
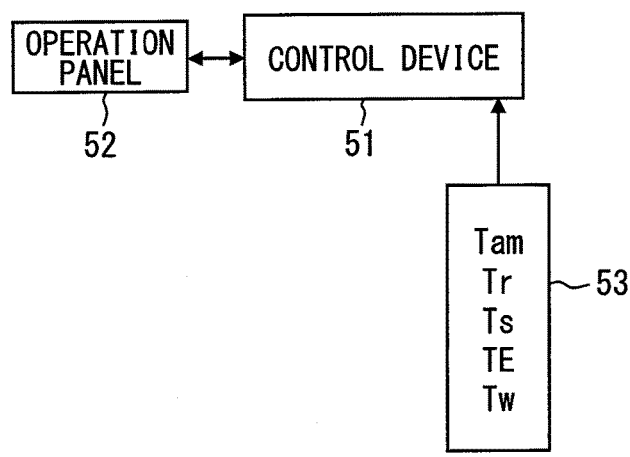
FIG. 1B is a schematic diagram of an electric control portion of the air conditioning device for vehicle of the first embodiment.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration.

The parts may be combined even if it is not explicitly described that the parts can be combined. The embodiments may be partially combined even if it is not explicitly described that the embodiments can be combined, provided there is no harm in the combination.

First Embodiment

Figure 2:
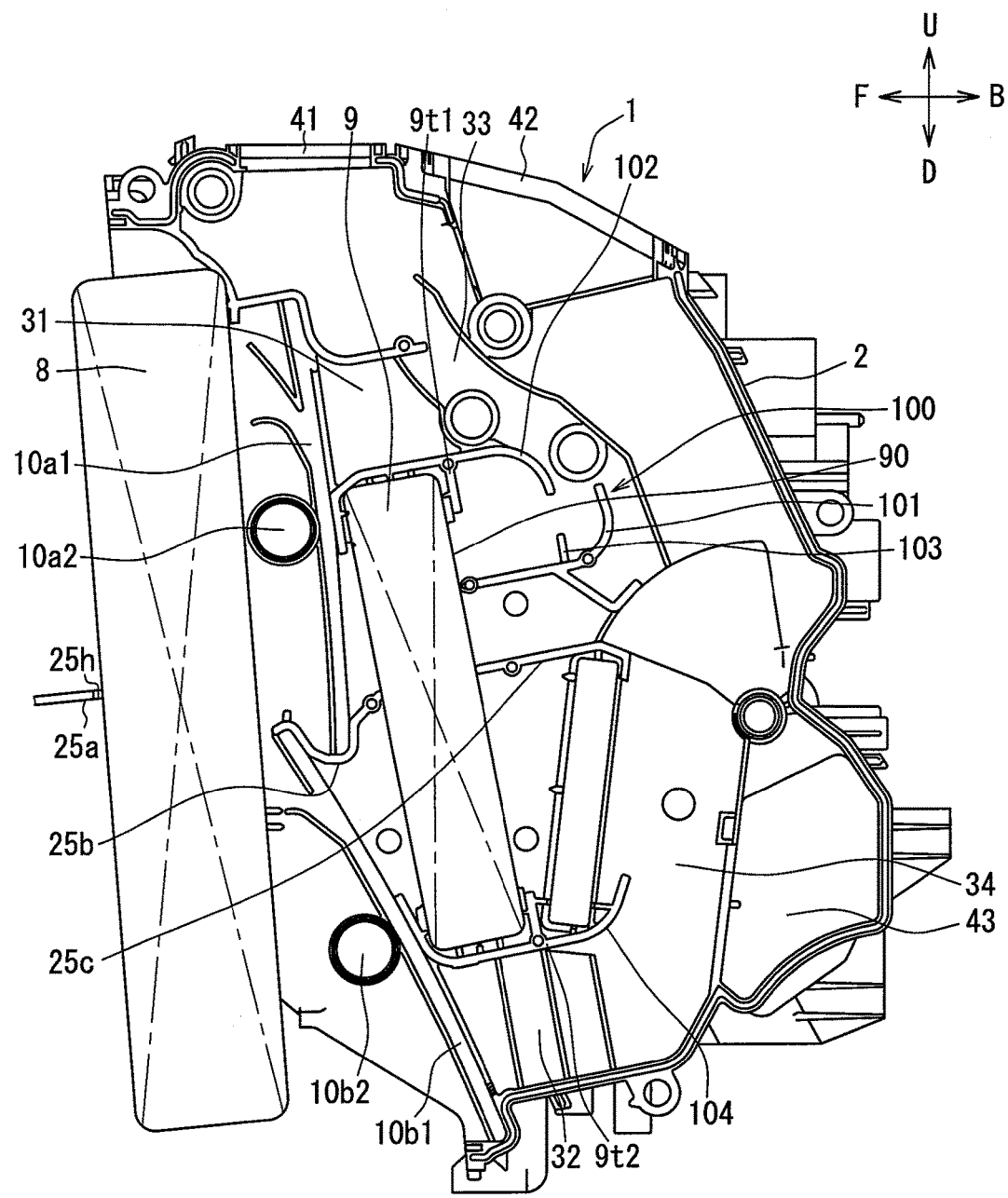
FIG. 2 is a sectional view showing a part of an air conditioning unit of the air conditioning device for vehicle of the first embodiment.

Hereinafter, a first embodiment of the present disclosure will be described in detail using FIG. 1A through FIG. 5. FIG. 1A schematically shows an air conditioning device 1 for vehicle for vehicle according to the first embodiment of the present disclosure. FIG. 2 shows a part of an air conditioning unit of the air conditioning device for vehicle of the first embodiment. In FIG. 2, arrows pointing upward, downward, forward, and backward denote, respectively, an upward direction U (vehicle ceiling direction), a downward direction D (vehicle floor direction), a forward direction F (vehicle forward movement direction), and a backward direction B (vehicle backward movement direction) when the air conditioning unit is equipped to a vehicle. The first embodiment describes the air conditioning device 1 for vehicle for vehicle adopting an inside and outside air bi-level structure, by which inside air and outside air can be sent through separate air passages.

Referring to FIG. 1A, an outside air inlet 3 and an inside air inlet 4 are provided at an inlet port of an air conditioning case 2 forming the air conditioning unit. The inside air or the outside air is selected by an inside and outside air switching door 6 that pivots about an axis 5 between a position indicated by a solid line and a position indicated by a broken line.

The selected air is introduced into the air conditioning case 2 by an air conditioning blower 7 and a temperature is controlled by a cooling heat exchanger 8 formed of an evaporator, a heating heat exchanger 9, and a first air mixing door 10a and a second air mixing door 10b (collectively referred to as air mixing doors 10).

FIG. 2 shows guide grooves 10a1 and 10b1 provided to the air conditioning case. The first air mixing door 10a and the second air mixing door 10b slide, respectively, in the guide grooves 10a1 and 10b1. The temperature-controlled air conditioning air is sent into a vehicle compartment.

Air drawn into the air conditioning case 2 from the outside air inlet 3 by the air conditioning blower 7 is dehumidified while passing through the cooling heat exchanger 8 by flowing an outside air passage 26. After the temperature is controlled by the heating heat exchanger 9 and the air mixing doors 10, the air conditioning air is sent out from a defroster outlet (denoted also by DEF) 47 and a face outlet (denoted also by FACE) 48. Antifogging properties are thus ensured.

A more detailed description will be given in the following. A ventilation system of the air conditioning device 1 for vehicle for vehicle is roughly divided to two parts, namely an air conditioning blower case 21 and the air conditioning case 2. The air conditioning blower case 21 is disposed under a dashboard in the vehicle compartment and offset from a center toward a passenger's seat. On the contrary, the air conditioning case 2 is disposed under the dashboard in the vehicle compartment substantially at a center in a right-left direction of the vehicle.

The air conditioning blower case 21 has an inside and outside air switching box 22 and the air conditioning blower 7 that blows out air by drawing in air through the inside and outside air switching box 22. The inside and outside air switching box 22 is provided with the outside air inlet 3 from which to introduce outside air (air outside the vehicle compartment) and the inside air inlet 4 from which to introduce inside air (air inside the vehicle compartment). Both of the inlets 3 and 4 are opened and closed by the inside and outside air switching door 6. In the present embodiment, the inside and outside air switching door 6 is driven by an electric actuator.

The air conditioning blower 7 includes a centrifugal fan, a drive motor, and a scroll case. The air conditioning blower 7 is configured in such a manner that the fan rotates inside the scroll case. The air conditioning blower case 21 is configured in such a manner that three modes can be switched from one another, and the three modes are an outside air mode in which outside air is sent, an inside air mode in which inside air is sent, and an inside and outside air bi-level mode in which outside air and inside air are sent separately.

The air conditioning case 2 houses the cooling heat exchanger 8 formed of an evaporator and the heating heat exchanger 9 formed of a heater core inside of which an engine coolant flows. The air conditioning case 2 is a mold article of resin, such as polypropylene, having reasonable elasticity and excellent strength.

More specifically, the air conditioning case 2 includes multiple split cases. After the heat exchangers 8 and 9 and devices described below, such as doors that control a flow of air, are stored in the multiple split cases, the multiple split cases are connected to form a single unit using a fastening method, such as screws.

The air conditioning case 2 is provided with two air inlet ports 23 and 24 on a side surface in a region on a forefront side of the vehicle. The two air inlet ports 23 and 24 correspond to two split scroll cases of the air conditioning blower case 21. In the outside air mode, outside air flows into both of the two air inlet ports 23 and 24. In the inside air mode, inside air flows into both of the two air inlet ports 23 and 24.

In the inside and outside air bi-level mode, outside air from one scroll case flows into the first air inlet port 23, which is one of the two air inlet ports 23 and 24, and inside air from the other scroll case flows into the second air inlet port 24, which is the other one of the two air inlet ports 23 and 24.

A partition plate 25 is disposed inside the air conditioning case 2. The partition plate 25 splits an air passage inside the air conditioning case 2 to the outside air passage 26 for air that has flowed inside from the first air inlet port 23 to flow, and an inside air passage 27 for air that has flowed inside from the second air inlet port 24 to flow. As is shown in FIG. 2, the partition plate 25 actually has a part 25a positioned upstream of the cooling heat exchanger 8 in an airflow direction, a part 25b positioned upstream of the heating heat exchanger 9 in the airflow direction, and a part 25c positioned downstream of the heating heat exchanger 9 in the airflow direction.

Hence, in the inside and outside air bi-level mode, outside air flows the outside air passage 26 and inside air flows the inside air passage 27. The partition plate 25 is provided so as to extend fully inside the air conditioning case 2 in the right-left direction of the vehicle. In the present embodiment, the partition plate 25 is provided integrally with the air conditioning case 2.

The outside air passage 26 is a passage above the partition plate 25, and the inside air passage 27 is a passage below the partition plate 25. In short, the inside air passage 27 is disposed below the outside air passage 26.

The cooling heat exchanger 8 is disposed inside the air conditioning case 2 at a region immediately after the air inlet ports 23 and 24. The cooling heat exchanger 8 is disposed inside the air conditioning case 2 fully from top to bottom and substantially parallel to a top-bottom direction (vertical direction) of the vehicle. A width dimension of the cooling heat exchanger 8 in the right-left direction of the vehicle (depth dimension on the sheet surface of FIG. 2) is designed to be substantially equal to a width dimension of the air conditioning case 2.

The cooling heat exchanger 8 has a heat-exchanging core portion that cools air conditioning air by absorbing evaporative latent heat of a refrigerant in a refrigeration cycle from the air conditioning air. The heat-exchanging core portion includes flat tubes inside of which the refrigerant passes through and corrugate fins bonded to the flat tubes.

The heat-exchanging core portion of the cooling heat exchanger 8 is disposed so as to penetrate through a through-hole 25h provided to a part of the partition plate 25 (25a and 25b). An upper part is positioned in the outside air passage 26 and a lower part is positioned in the inside air passage 27. Hence, in the cooling heat exchanger 8, the upper part of the heat-exchanging core portion cools air flowing the outside air passage 26 (indicated by an arrow Y11) and the lower part of the heat-exchanging core portion cools air flowing the inside air passage (indicated by an arrow Y12).

A structure of a peripheral portion of the heat exchangers schematically shown in FIG. 1A will be described in detail using FIG. 2. A heater core forming the heating heat exchanger 9 is disposed downstream (vehicle rear side) of the cooling heat exchanger 8 in the airflow direction with a predetermined interval. The heating heat exchanger 9 is disposed inside the air conditioning case 2 on a lower side with a slight inclination with respect to the top-bottom direction of the vehicle. A width dimension of the heating heat exchanger 9 in the right-left direction of the vehicle is designed to be substantially equal to a width dimension of the air conditioning case 2.

The heating heat exchanger 9 is a heat exchanger that heats cold air that has passed through the cooling heat exchanger 8, and has a heat-exchanging core portion including multiple tubes (flat tubes) inside of which a hot engine coolant (heat-exchanging medium) passes through and corrugate fins bonded to the tubes.

The heating heat exchanger 9 also has an upper tank disposed above the heat-exchanging core portion and a lower tank disposed below the heat-exchanging core portion as tanks from which the engine coolant is distributed to the multiple tubes and into which the engine coolant is collected from the multiple tubes. The tanks, however, are not shown in FIG. 2 because the heating heat exchanger 9 is shown schematically as a whole.

The heat-exchanging core portion of the heating heat exchanger 9 is disposed so as to penetrate through a through-hole provided to the partition plate 25, and an upper part is positioned in the outside air passage 26 and a lower part is positioned in the inside air passage 27. For the heating heat exchanger 9 to be disposed in the manner as above, the part 25b of the partition plate 25 bends downward between the cooling heat exchanger 8 and the heating heat exchanger 9. Consequently, the upper part of the heat-exchanging core portion heats air flowing the outside air passage 26 and the lower part of the heat-exchanging core portion heats air flowing the inside air passage 27.

As is shown in FIG. 1A, the first and second air mixing doors 10 (10a and 10b) forming a temperature adjustment portion are disposed inside the air conditioning case 2 at a region between the heating heat exchanger 9 and the cooling heat exchanger 8.

The first air mixing door 10a controls hot air heated by the upper part of the heat-exchanging core portion of the heating heat exchanger 9 and bypass air heading above the heating heat exchanger 9. That is to say, the first air mixing door 10a adjusts an air volume ratio between air that bypasses the heating heat exchanger 9 by passing a first cold air bypass passage 31 and air that passes through the interior of the heating heat exchanger 9. Hot air from the upper part of the heat-exchanging core portion of the heating heat exchanger 9 and cold air from the first cold air bypass passage 31 are mixed in a first air mixing portion 33 and turned to air at a desired temperature.

The second air mixing door 10b adjusts an air volume ratio between hot air that is heated by the lower part of the heat-exchanging core portion of the heating heat exchanger 9 and cold air that bypasses the heating heat exchanger 9 by passing a second cold air bypass passage 32. Hot air from the lower part of the heat-exchanging core portion of the heating heat exchanger 9 and cold air from the second cold air bypass passage 32 are mixed in a second air mixing portion 34 and turned to air at a desired temperature.

The first and second air mixing doors 10 are formed of a sliding door that moves by sliding. Although it is not shown in the drawing, each of the first and second air mixing doors includes a plate-like door main body portion and a rack combined into one unit.

The rack of the first air mixing door 10a meshes with a pinion (not shown) provided to a first shaft and the first shaft is driven to rotate by an electric actuator (not shown). Accordingly, rotational motion of the first shaft is converted to sliding motion of the first air mixing door 10a and a slide position of the first air mixing door 10a is adjusted.

Likewise, the rack of the second air mixing door 10b meshes with a pinion (not shown) provided to a second shaft and the second shaft is driven to rotate by an electric actuator (not shown). Accordingly, rotational motion of the second shaft is converted to sliding motion of the second air mixing door 10b and a slide position of the second air mixing door 10b is adjusted.

The first and second shafts extend in the right-left direction of the vehicle and are supported on side surfaces of the air conditioning case 2 in a rotatable manner. One ends of the first and second shafts penetrate through a side wall of the air conditioning case 2 and are coupled to the electric actuators (not shown) on the outside of the air conditioning case 2.

Both ends of the first air mixing door 10a in the width direction are inserted into the first guide grooves 10a1 (FIG. 2) provided to the side surfaces of the air conditioning case 2. Likewise, both ends of the second air mixing door 10b in the width direction are inserted into the second guide grooves 10b1 provided to the side surfaces of the air conditioning case 2.

Each of the first and second guide grooves 10a1 and 10b1 are provided by a pair of opposing walls protruding from the side surfaces of the air conditioning case 2 to an inner side of the air conditioning case 2. The first guide grooves 10a1 extend substantially in the top-bottom direction and substantially parallel to an air inflow surface of the heating heat exchanger 9. The first guide grooves 10a1 guide an operation direction (sliding movement direction) of the first air mixing door 10a substantially parallel to the air inflow surface of the heating heat exchanger 9 and substantially in the top-down direction.

The second guide grooves 10b1 extend by inclining to a direction close to a horizontal direction in comparison with the first guide grooves 10a1. The second guide grooves 10b1 guide an operation direction (sliding movement direction) of the second air mixing door 10b to a direction laid on the horizontal side in comparison with the operation direction (sliding movement direction) of the first air mixing door 10a.

A defroster opening 41 opens in a top surface of the air conditioning case 2 at a region adjacent to the first air mixing portion 33. The defroster opening 41 is an opening to let in temperature-controlled air conditioning air from the first air mixing portion 33, and connected to the defroster outlet 47 via an unillustrated defroster duct. Air is blown out from the defroster outlet 47 toward an inner surface of a windshield (window glass) 46 at the front of the vehicle.

A face opening 42 opens in the top surface of the air conditioning case 2 at a region more on the vehicle rear side (closer to the occupant) than the defroster opening 41. The face opening 42 is an opening to let in temperature-controlled air conditioning air from the first air mixing portion 33.

The face opening 42 is connected to the face outlet (denoted also by FACE) 48 disposed on the upper side of the dashboard via an unillustrated face duct. Air is blown out from the face outlet 48 toward the face of an occupant sitting in the front seat in the vehicle compartment. The defroster opening 41 and the face opening 42 are opened and closed by unillustrated doors (opening doors).

A foot opening 43 opens in a vehicle rear portion of the air conditioning case 2 at a region adjacent to the second air mixing portion 34. The foot opening 43 is an opening to let in temperature-controlled air conditioning air from the second air mixing portion 34 and opens in the both side surfaces of the air conditioning case 2 on the right and left.

Unillustrated foot doors that open and close the respective foot openings 43 are disposed in the vehicle rear portion of the air conditioning case 2. The foot doors are turned by a rotation shaft disposed in the right-left direction of the vehicle. The foot doors are coupled to an unillustrated electric actuator and operated to rotate by an actuator mechanism. The partition plate 25 extends also to the vehicle rear side of the heating heat exchanger 9 and therefore also plays a role of separating the first and second air mixing portions 33 and 34 together with an unillustrated door.

Figure 3:
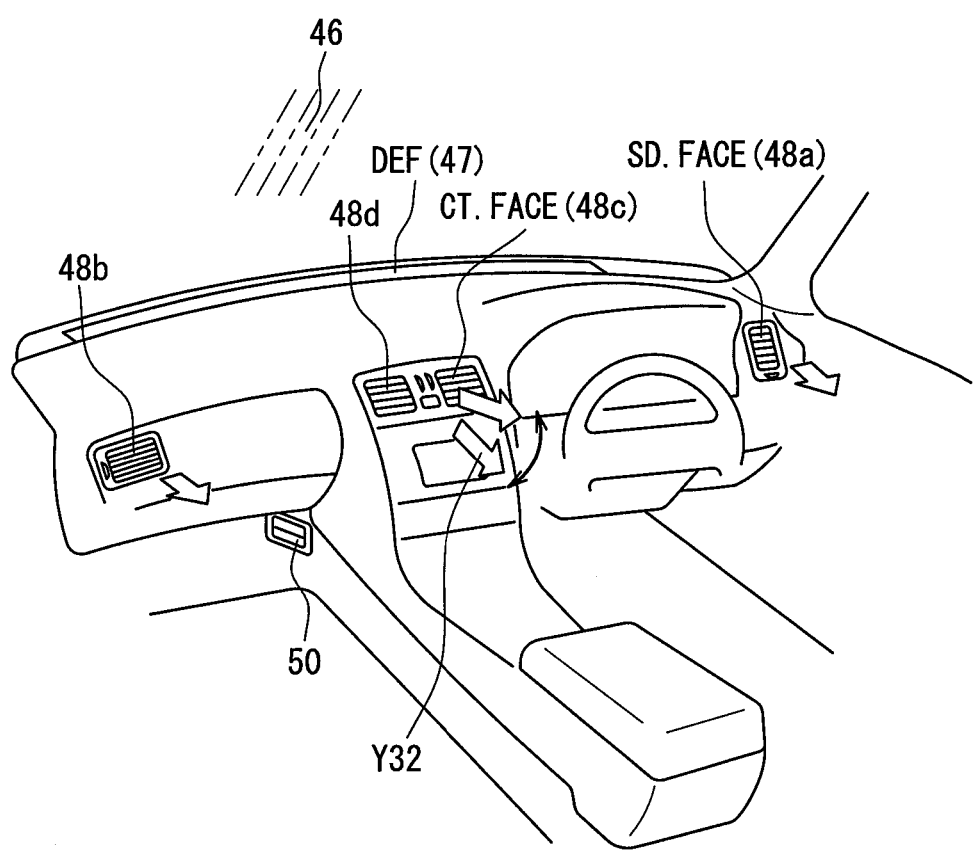
FIG. 3 is a perspective view showing an interior of a vehicle compartment equipped with the air conditioning device for vehicle of the first embodiment.

FIG. 3 shows an interior of the vehicle compartment equipped with the air conditioning device for vehicle of the first embodiment. As are shown in FIG. 1A and FIG. 3, air from the defroster opening 41 is blown out toward the windshield 46 of the vehicle via the defroster opening 47.

Air from the face opening 42 is blown out to the face of the occupant via side face outlets (denoted also by SD.FACE) 48a and 48b and center face outlets (denoted also by CT.FACE) 48c and 48d.

As is shown in FIG. 3, the side face outlets 48a and 48b are provided at both ends on the right and left of the vehicle. The center face outlets 48c and 48d are provided in a pair at a center of the dashboard. The side face outlets 48a and 48b and the center face outlets 48c and 48d are collectively referred to simply also as the face outlets 48.

Figure 4:
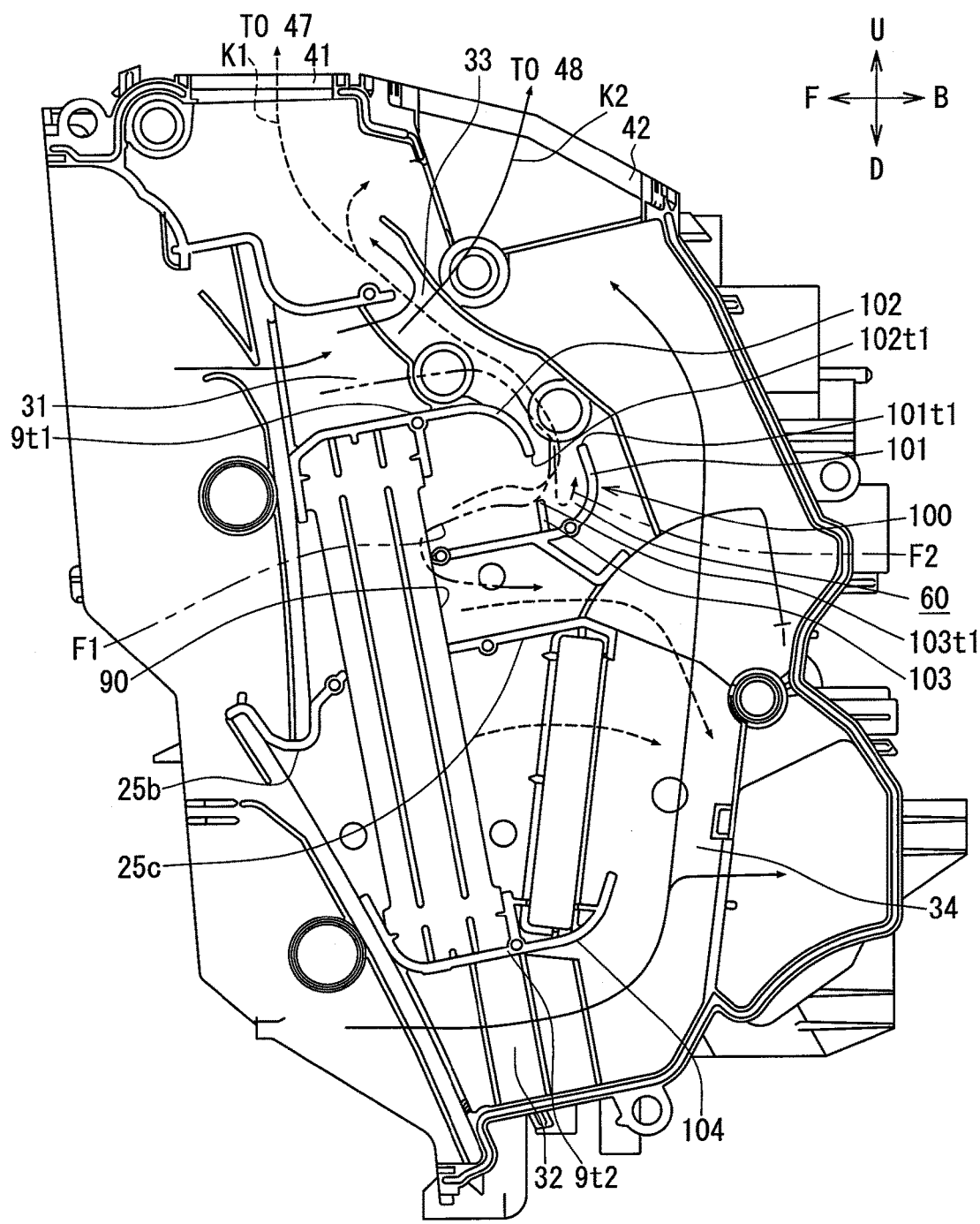
FIG. 4 is a schematic sectional view showing flows of air in the air conditioning unit of the first embodiment.

FIG. 4 describes flows of air inside the air conditioning case 2 shown in FIG. 2. Flows of air in the vehicle compartment in the first embodiment will be described using FIG. 1A through FIG. 4. Air from the defroster outlet 47 (FIG. 3) and air from the face outlets 48 flow in an upper part of the vehicle compartment.

Because the inside and outside air bi-level structure is adopted, the air includes a large volume of outside air which is fresh air. The air including a large volume of outside air is blown toward the face of a driver from the center face outlets 48c and 48d and the side face outlets 48a and 48b.

Alternatively, an outlet direction may swing as indicated by an arrow Y32 of FIG. 3. Air that has flowed out from the foot opening 43 is blown out from foot outlets (denoted also by FOOT) 50 (FIG. 3), and circulates in a lower part of the vehicle compartment. The air circulating in the lower part near the foot includes a large amount of inside air which is warm air.

That is to say, fresh air at a low humidity drawn in from the outside air inlet 3 (FIG. 1A) is blown out from the defroster outlet 47 after passing through the cooling heat exchanger 8 and the heating heat exchanger 9 inside the air conditioning case 2. Fogging on the windshield 46 is thus prevented. Also, fresh air is supplied to an upper part of the vehicle compartment while warm air is blown out toward the foot from the foot outlets 50 by introducing inside air from the inside air inlet 4.

An electric control portion of the air conditioning device 1 for vehicle for vehicle of the present embodiment will now be described briefly. The air conditioning device 1 for vehicle for vehicle is automatically controlled by an air conditioning control device 51 of FIG. 1B. The air conditioning control device 51 is so-called an ECU and includes a micro-computer and so on, and controls the respective air conditioning devices installed in the air conditioning blower case 21 and the air conditioning case 2 according to pre-set programs. A power is supplied to the air conditioning control device 51 from an in-vehicle battery (not shown) when an ignition switch (not shown) of an engine equipped to the vehicle is turned ON.

The air conditioning control device 51 receives inputs of sensor signals from a sensor group 53 and operation signals from an air conditioning operation panel 52 provided to the dashboard at the front in the vehicle compartment. The sensor group 53 includes an outside air temperature sensor that detects a temperature outside the vehicle compartment (outside air temperature) Tam and an inside air temperature sensor that detects a temperature inside the vehicle compartment (inside air temperature) Tr. The sensor group 53 also includes a solar radiation sensor that detects an amount of solar radiation, Ts, into the vehicle compartment, a cooling heat exchanger temperature sensor that detects an outlet air temperature TE of the cooling heat exchanger 8, a water temperature sensor that detects a temperature of hot water, Tw, to the heating heat exchanger 9, and so on.

Although it is not shown in the drawing, the operation panel 52 is provided with a temperature setting switch to set a pre-set temperature (Tset), an outlet mode setting switch, an inside and outside air mode setting switch, an air conditioning mode setting switch, and so on.

Drive devices of the respective air conditioning devices controlled by the air conditioning control device 51 include a drive motor of the inside and outside air switching door 6, a drive motor of the air conditioning blower 7, drive motors of actuator mechanisms of various doors including the first and second air mixing doors 10 and unillustrated doors, such as the face door and the foot doors, and so on.

An operation in the present embodiment by the configuration as above will now be described. In the air conditioning device 1 for vehicle for vehicle of the present embodiment, the air conditioning control device 51 runs an air conditioning control program pre-stored in a storage circuit upon input of an operation signal of the air conditioning device 1 for vehicle for vehicle from the operation panel 52 while the vehicle is in operation.

When the air conditioning control program is run, detection signals detected by the sensor group 53 and operation signals of the operation panel 52 are read in and a known target outlet air temperature (TAO) of outlet air into the vehicle compartment is calculated on the basis of the read signals.

Further, the air conditioning control device 51 determines control states of the fan drive motor that drives the air conditioning blower 7, the various electric actuators in the air conditioning case 2, and so on according to the target outlet air temperature (TAO), and outputs control signals to the various actuators so as to obtain the determined control states. Subsequently, the air conditioning control device 51 again repeats a routine: reading the detection signals and the operation signals→calculating the target outlet air temperature (TAO)→determining new control states→outputting control signals.

For example, a control state of the drive motor of the air conditioning blower 7 is determined according to the target outlet air temperature (TAO) with reference to a control map pre-stored in the storage circuit. More specifically, a volume of blown air is controlled to be in the vicinity of a maximum volume by assuming that a control voltage outputted to the electric motor in an extremely low temperature range (maximum cooling range) and an extremely high temperature range (maximum heating range) of the target outlet air temperature (TAO) is a maximum voltage. The volume of blown air is decreased as the target outlet air temperature (TAO) nears an intermediate temperature range.

A control state of the electric actuators of the first and second air mixing doors 10 is determined in such a manner that a degree of opening of the first and second air mixing doors 10 coincides with a target degree of opening (SW). The target degree of opening (SW) is calculated by a known manner from the outlet air temperature TE of the cooling heat exchanger 8 detected by the cooling heat exchanger temperature sensor, the hot water temperature Tw of the engine coolant detected by the water temperature sensor, and so on.

Herein, when a degree of opening (SW) is 100(%), the first and second air mixing doors 10 are at a maximum heating position (MaxHot). Hence, the first and second air mixing doors 10 fully close the first and second cold air bypass passages and fully open on the sides of the heating heat exchanger 9. Also, when a degree of opening (SW) is 0(%), the first and second air mixing doors 10 are at a maximum cooling position (MaxCool). Hence, the first and second air mixing doors 10 fully open the first and second cold air bypass passages and fully close on the sides of the heating heat exchanger 9.

A control state of the electric actuator of the inside and outside air switching door 6 is determined according to the target outlet air temperature (TAO) with reference to a control map pre-stored in the air conditioning control device 51. In the present embodiment, the outside air mode to introduce outside air is selected preferentially as a rule. However, the inside air mode is selected at the time of the maximum cooling during which the target outlet air temperature (TAO) is in the extremely low temperature range and the inside and outside air bi-level mode is selected at the time of maximum heating during which the target outlet air temperature (TAO) is in the extremely high temperature range.

Regarding a control state of the electric actuator of the outlet mode switching device, the outlet mode is successively switched as follows while the target outlet air temperature (TAO) rises from the low temperature range to the high temperature range: face mode→bi-level mode→foot mode.

Hence, the face mode is selected mainly at the time of cooling during summer when the target outlet air temperature (TAO) is in the low temperature range. The bi-level mode is selected mainly at the time of air conditioning during spring and autumn when the target outlet air temperature (TAO) is in the intermediate temperature range. The foot mode is selected mainly at the time of cooling during winter when the target outlet air temperature (TAO) is in the low temperature range. Alternatively, a vehicle compartment humidity sensor may be provided further, so that a defroster mode is selected when it is determined on the basis of a detection signal of the humidity sensor that fogging formation is highly likely to occur on the windshield.

According to the present embodiment, the heating heat exchanger 9 is disposed on the vehicle rear side (one side in the horizontal direction) of the first air mixing door 10a and the second air mixing door 10b. The sliding movement direction of the second air mixing door 10b in the second guide grooves 10b1 is inclined in such a manner that a slide lower end position is positioned more on the vehicle rear side (on the side of the heating heat exchanger 9) than a slide upper end position. The slide lower end position of the second air mixing door 10b is positioned more on the vehicle rear side (on the side of the heating heat exchanger 9) than a sliding movable range of the first air mixing door 10a.

As is shown in FIG. 2, the heating heat exchanger 9 is disposed in such a manner that the heating heat exchanger 9 is inclined to the same side as the sliding movement direction of the second air mixing door 10b and positioned directly above a sliding movable range of the second air mixing door 10b at least partially. Hence, a physical size of the air conditioning case 2 in a front-rear direction of the vehicle (horizontal direction) can be reduced.

A slide lower end position of the first air mixing door 10a is positioned more on the vehicle rear side (on the side of the heating heat exchanger 9) and lower than the slide upper end position of the second air mixing door 10b. Hence, a physical size of the air conditioning case 2 in the top-bottom direction can be reduced.

A first shaft attachment hole 10a2 of the first air mixing door 10a is disposed adjacently to the upper tank of the heating heat exchanger 9. A second shaft attachment hole 10b2 of the second air mixing door 10b is disposed adjacently to the lower tank of the heating heat exchanger 9. Hence, blocking of air passing through the heat-exchanging core portion of the heating heat exchanger 9 by the first shaft and the second shaft can be restricted.

In summary, the air conditioning device 1 for vehicle for vehicle of the first embodiment has the air conditioning case 2. Inside the air conditioning case 2, the air conditioning device 1 for vehicle for vehicle has the cooling heat exchanger 8 that cools inside air which is air inside the vehicle compartment and outside air which is air outside the vehicle compartment, and the heating heat exchanger 9 disposed downstream of the cooling heat exchanger 8 in the airflow direction.

The air conditioning device 1 for vehicle for vehicle has the air mixing doors 10 (10a and 10b) disposed between the cooling heat exchanger 8 and the heating heat exchanger 9 and adjusting a degree of heating by the heating heat exchanger 9 for cold air that has passed through the cooling heat exchanger 8 by controlling a flow of the cold air.

The air conditioning device 1 for vehicle for vehicle has the outlets from which temperature-adjusted air by the air mixing doors 10 is blown into the vehicle compartment. As is shown in FIG. 3, the outlets include the defroster outlet 47 from which air is blown toward the windshield 46, the side face outlets 48a and 48b, the center face outlets 48c and 48d, and the foot outlets 50. The side face outlets 48a and 48b and the center face outlets 48c and 48d branch from the single opening 42 (FIG. 1A) in the air conditioning case each using a different duct, and are therefore collectively referred to also as the face outlets 48.

The air conditioning device 1 for vehicle for vehicle has an airflow regulation wall 100 (101, 102, and 103) disposed downstream of the heating heat exchanger 9 in the airflow direction and introducing air that has flowed out from the heating heat exchanger 9 to the respective outlets 47, 48 and 50 as shown in FIG. 4.

An airflow of cold air that has flowed out from the cooling heat exchanger 8 is controlled by the first and second air mixing doors 10a and 10b. A first path K1 (first passage) is accordingly formed, along which air passes through the interior of the heating heat exchanger 9, flows in the upward direction U from the downstream side of the heating heat exchanger 9, and reaches the defroster outlet 47 and the face outlets 48.

An airflow of cold air that has flowed out from the cooling heat exchanger 8 is controlled by the first and second air mixing doors 10a and 10b, and the cold air flows without passing through the interior of the heating heat exchanger 9 (that is, by bypassing the heating heat exchanger 9). The air forms a second path K2 (second passage) along which the air reaches the defroster outlet 47 and the face outlets 48 from above the heating heat exchanger 9.

The airflow regulation wall 100 includes guide plates 100 (generic name of 101, 102, 103, and so on) that guide a flow of air on the downstream side of the heating heat exchanger 9. In order to form the first path K1, the guide plates 100 have a first guide 101 that extends upright from a downstream wall surface 90 of the heating heat exchanger 9 to a downstream side in the airflow direction and bends to extend in the upward direction U. The first guide 101 introduces air to the outlets by letting the air flow up in the upward direction U from the downstream side of the heating heat exchanger 9 along the first path K1.

The first guide 101 is a guide to form the first path. FIG. 4 shows the configuration of the air conditioning case 2 without the heating heat exchanger 9. Hence, the downstream wall surface 90 of FIG. 4 indicates a position at which to dispose the downstream wall surface 90 of the heating heat exchanger 9.

Further, as shown in FIG. 4, the guide plates 100 have a second guide 102 that has influences on the second path K2 along which air reaches the defroster outlet 47 and the face outlets 48 from above the heating heat exchanger 9 without passing through the interior of the heating heat exchanger 9.

In order to hold a heat exchanger other than the cooling heat exchanger 8 and the heating heat exchanger 9, the second guide 102 extends upright from an upper end part 9t1 of the heating heat exchanger 9 to the downstream side and bends to extend in the downward direction D.

An end 101t1 of the first guide 101 is disposed in a region farther from the heating heat exchanger 9 than an end 102t1 of the second guide 102. In other words, a distance between the end 101t1 of the first guide 101 and the downstream wall surface 90 of the heating heat exchanger 9 is longer than a distance between the end 102t1 of the second guide 102 and the downstream wall surface 90 of the heating heat exchanger 9. The guide plates 100 also have a third guide 103 that extends from the first guide 101 toward the end 102t1 of the second guide 102. The third guide is a guide to restrict contact heating air.

Figure 5:
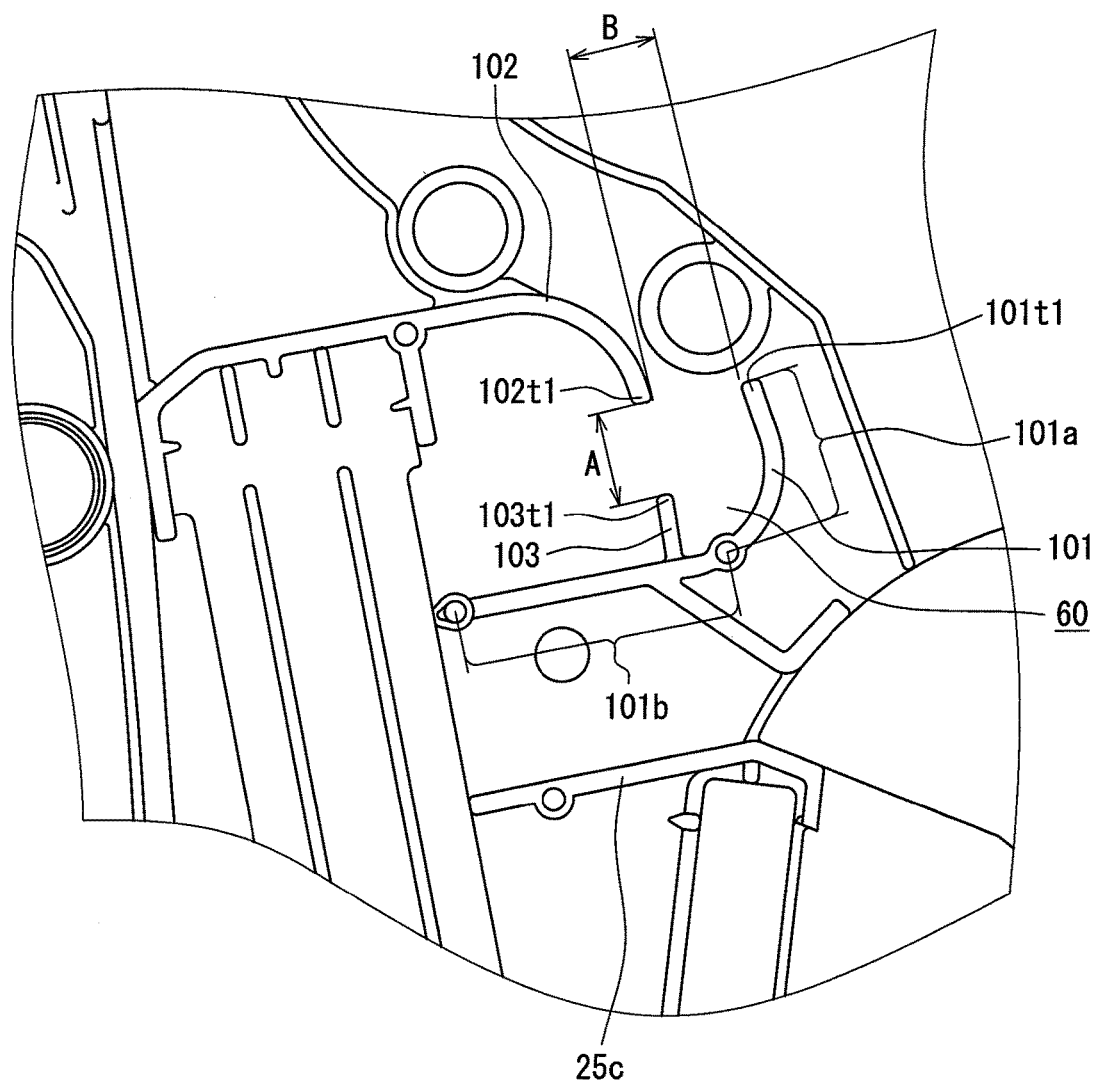
FIG. 5 is a sectional view showing a part of the air conditioning unit of the first embodiment.

FIG. 5 shows an enlarged part of FIG. 4. As is shown in FIG. 5, the third guide 103 extends toward the end 102t1 of the second guide 102 from a base portion 101b of the first guide 101 extending to the downstream side in the airflow direction. In FIG. 5, a dimension from an end 103t1 of the third guide 103 to the end 102t1 of the second guide 102 is denoted by a dimension A. Also, a dimension from the end 101t1 of the first guide 101 to the end 102t1 of the second guide 102 is denoted by a dimension B. The dimension A is set in a range 0.7 to 1.3 times longer than the dimension B. Regarding a relation of the dimension A and the dimension B as to which is larger than which, the relation may be set so as to establish an inequality: $B \leq A \leq 1.3 \times B$.

Referring to FIG. 2, the partition plate 25 (25b, 25c) that splits air flowing into the heating heat exchanger 9 to two types, namely upper air and lower air flowing below the upper air, is provided at least downstream of the cooling heat exchanger 8. As are shown in FIG. 1A and FIG. 2, the partition plate 25 is also provided upstream of the cooling heat exchanger 8 as the partition plate 25a in order to form the inside and outside air bi-level structure.

As is shown in FIG. 4, the first guide 101 is provided between the partition plate 25c on the downstream side of the heating heat exchanger 9 and the second guide 102. The air conditioning case 2 of the first embodiment has the inside and outside air bi-level structure, by which air outside the vehicle is passed above the partition plate 25 and inside air inside the vehicle compartment is passed below the partition plate 25.

The cooling heat exchanger 8 is formed of an evaporator that is cooled by letting a refrigerant evaporate. The heating heat exchanger 9 is formed of a heater core inside of which the engine coolant flows. Either an electric heater that generates heat when current is passed or a condenser that generates heat by letting refrigerant condense may be adopted instead of the heater core.

Functions and effects of the first embodiment will be described in the following. According to the first embodiment, the air conditioning device 1 for vehicle for vehicle has the first path K1 (indicated by a broken line of FIG. 4) and the second path K2 (indicated by a solid line) as paths along which air flows. Along the first path K1, an airflow of cold air that has flowed out from the cooling heat exchanger 8 is controlled by the air mixing doors 10 to pass through the interior of the heating heat exchanger 9. Air heated in the heating heat exchanger 9 reaches the openings 41 and 42 by flowing in the upward direction U from the downstream side of the heating heat exchanger 9.

Along the second path K2, an air flow of cold air that has flowed out from the cooling heat exchanger 8 is controlled by the air mixing doors 10 to reach the outlets 48 and so on from above the heating heat exchanger 9 without passing through (by bypassing) the interior of the heating heat exchanger 9.

The air conditioning device 1 for vehicle for vehicle is provided with the guide plates 100 (generic name of 101, 102, 103, and so on) having influences on a flow of air on the downstream side of the heating heat exchanger 9. In order to form the first path K1, the guide plates 100 have the first guide 101 that extends to the downstream side from the downstream wall surface 90 of the heating heat exchanger 9 and bends in the upward direction U. Hence, heated air that has flowed out from the interior of the heating heat exchanger 9 is introduced to the first path K1.

Further, in order to hold another heat exchanger, the guide plates 100 have the second guide 102 that extends to the downstream side from the upper end part 9t1 of the heating heat exchanger 9 and bends in the downward direction D. The end 101t1 of the first guide 101 is provided farther from the heating heat exchanger 9 than the end 102t1 of the second guide 102.

Hence, without the third guide, air may flow in from a space between the end 101t1 of the first guide 101 and the end 102t1 of the second guide 102 and contact heating air F1 (alternate long and two short dashes line) that is heated upon contact with the downstream wall surface 90 of the heating heat exchanger 9 may possibly be generated.

In order to restrict the contact heating air F1, the guide plates 100 have the third guide 103 extending from the first guide 101 toward the end 102t1 of the second guide 102 (and parallel to the downstream wall surface 90). Hence, air makes a U-turn due to a dynamic pressure as is indicated by an arrow F2 in a space 60 between the third guide 103 and the first guide 101. The contact heating air F1 is thus restricted and hence a fluctuation of a temperature of air conditioning air can be restricted. In other words, the air conditioning device 1 for vehicle for vehicle has a direction changing portion that changes a flow direction of cold air heading for the heating heat exchanger 9 in the first path K1 from the second path K2 to head for the outlets 47 and 48. More specifically, the direction changing portion is formed of the first guide 101 and the third guide 103 and includes the space 60 defined by the first guide 101 and the third guide 103. The direction changing portion changes a flow direction of cold air that has flowed into the space 60 from the second path K2 along the second guide 102 to head for the outlets 47 and 48. The space 60 is positioned between a portion 101a of the first guide 101 that extends in the upward direction U and the third guide 103.

Ribs that block the contact heating air F1 may be provided to the second guide 102 with the intention of restricting the contact heating air F1. However, a negative pressure is generated on the downstream side of the ribs due to a flow of the cold air bypassing the heating heat exchanger 9. Hence, contrary to the intention, hot air may be drawn from the downstream wall surface 90 of the heating heat exchanger 9.

As shown in FIG. 5, in the first embodiment, a dimension from the end 103t1 of the third guide 103 to the end 102t1 of the second guide 102 is given as the dimension A. Also, a dimension from the end 101t1 of the first guide 101 to the end 102t1 of the second guide 102 is given as the dimension B. The dimension A is set in a rage 0.7 to 1.3 times longer than the dimension B. The first path K1 and the second path K2 can be thus formed at the same time while restricting the contact heating air F1.

The dimension A and the dimension B regulate dimensions of inlet and outlet ports for the downstream wall surface 90 of the heating heat exchanger 9. Outgoing air is the air that passes along the first path K1. Meanwhile, incoming air flows in from a space between the end 101t1 of the first guide 101 and the end 102t1 of the second guide 102.

The inflow air turns to the contact heating air F1 (alternate long and two short dashes line) that is heated upon contact with the downstream wall surface 90 of the heating heat exchanger 9. When the dimension A in the top-bottom direction is smaller than the dimension B in the front-rear direction (A<B), ventilation resistance is generated against a flow of air passing along the first path K1. Hence, an air volume is reduced and a preferable air volume ratio cannot be obtained. Moreover, blown air noise may become louder. However, by setting the relation of the dimension A and the dimension B as to which is larger than which to satisfy an inequality: B≤A≤1.3×B, a reduction in air volume and blown air noise can be restricted.

In the first embodiment, the partition plate 25 (25b, 25c) that splits air flowing into the heating heat exchanger 9 to two types, namely, upper air and lower air flowing below the upper air, is provided downstream of the cooling heat exchanger 8. The first guide 101 is disposed in the top-bottom direction between the partition plate 25c on the downstream side of the heating heat exchanger 9 and the second guide 102.

Hence, warm air passing through the upper part of the heating heat exchanger 9 can be passed along the first path K1 and blown out to an upper part of the vehicle compartment. Also, the lower air flowing below the partition plate 25c on the downstream side of the heating heat exchanger 9 can be blown out to a lower part of the vehicle compartment. In the present embodiment, the upper air is outside air and the lower air is inside air.

The air conditioning case 2 of the air conditioning device for vehicle of the first embodiment adopts the inside and outside air bi-level structure. Hence, the antifogging effect on the windshield 46 of FIG. 3 can be excellent and heating efficiency can be enhanced by circulating inside air from the foot outlets 50 near the foot of the occupant.

In the air conditioning case 2 adopting the inside and outside air bi-level structure, a cold air passage is split to an upper side and an lower side with the heat exchanger in between. In the upper passage, in particular, air readily flows into a space in front of the heating heat exchanger 9 at the time of FACE mode MaxCool, during which air conditioning air cooled to the maximum extent is blown out from the face opening 42 through which air reaching the face outlets 48 flows.

The air exchanges heat by making contact with the downstream wall surface 90 of the heating heat exchanger 9 as the contact heating air F1. Such exchanging of heat is disadvantageous when a temperature is adjusted with accuracy. The cooling heat exchanger 8 is formed of an evaporator that is cooled by letting the refrigerant evaporate and the heating heat exchanger 9 is formed of a heater core inside of which the engine coolant flows.

In the first embodiment, in order to restrict the contact heating air F1, the guide plates 100 have the third guide 103 that extends from the first guide 101 toward the end 102t1 of the second guide 102 as shown in FIG. 4. In one example, the third guide 103 extends parallel to the downstream wall surface 90 of the heating heat exchanger 9. Hence, the contact heating air F1 is blocked by the third guide 103 and a flow of the contact heating air F1 to the downstream wall surface 90 of the heating heat exchanger 9 is restricted. Consequently, a fluctuation of a temperature of air conditioning air can be restricted.

Second Embodiment

A second embodiment will now be described. In respective embodiments below, a description of components same as the counterparts of the first embodiment above is omitted by attaching same reference numerals and a description will be given to a different configuration. In the second and subsequent embodiments, reference numerals same as the reference numerals used in the first embodiment above denote the same configurations and the description given above is also applied herein.

Figure 6:
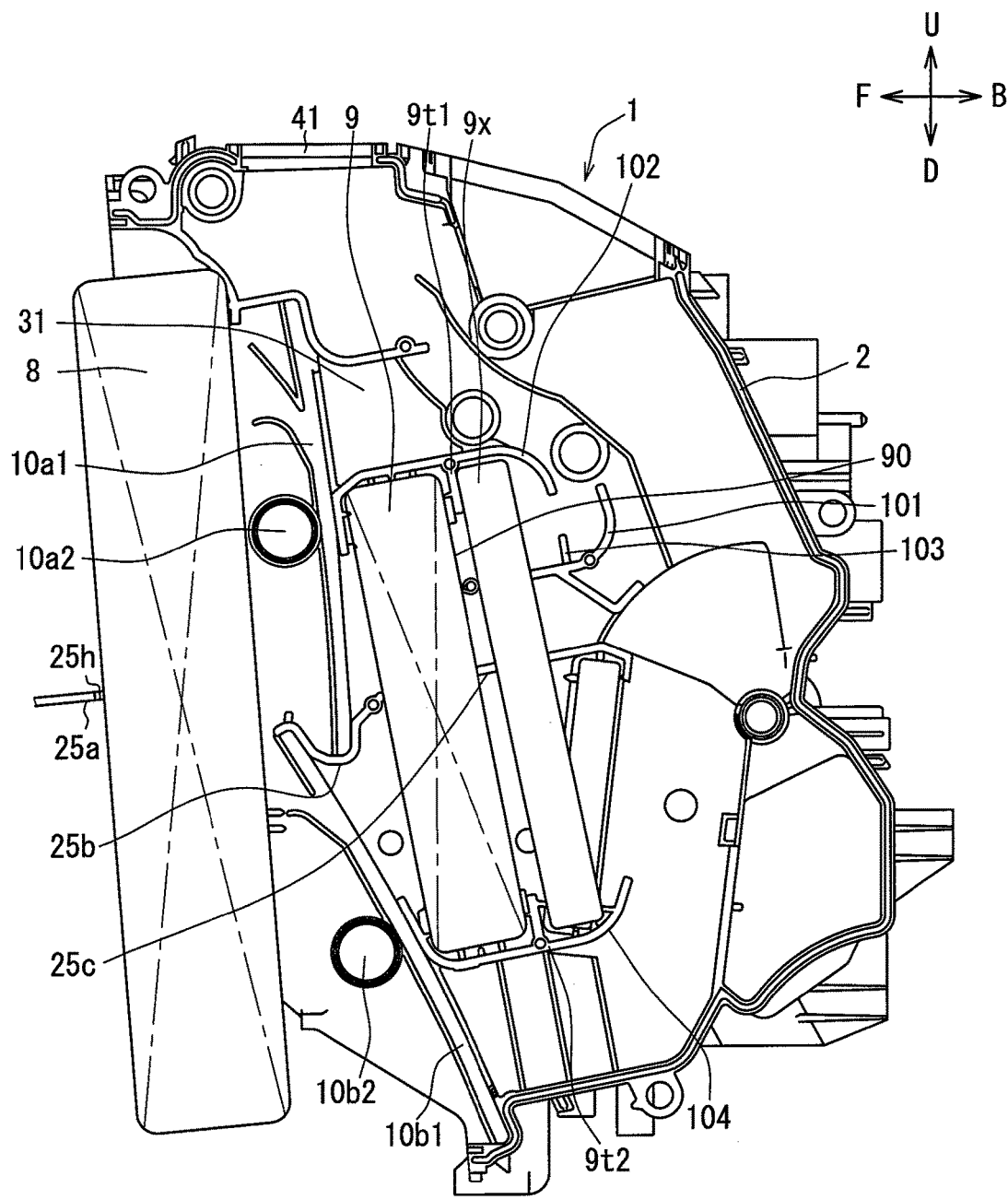
FIG. 6 is a schematic view showing a part of an air conditioning unit of an air conditioning device for vehicle according to a second embodiment of the present disclosure.

FIG. 6 shows the second embodiment of the present disclosure. Referring to FIG. 6, an electric heater as a heating sub-heat exchanger 9x forming another exchanger is provided downstream of a heating heat exchanger 9 forming a heater core. The electric heater is capable of controlling an amount of heat generation by switching connections of multiple PTC heaters.

An upper end of the heating sub-heat exchanger 9x forming a heat exchanger other than a cooling heat exchanger 8 and the heating heat exchanger 9 is held on a second guide 102. A lower end of the heating sub-heat exchanger 9x is held on a lower end guide 104 that extends from a lower end 9t2 of the heating heat exchanger 9 and bends to extend in an upward direction U.

Third Embodiment

Figure 7:
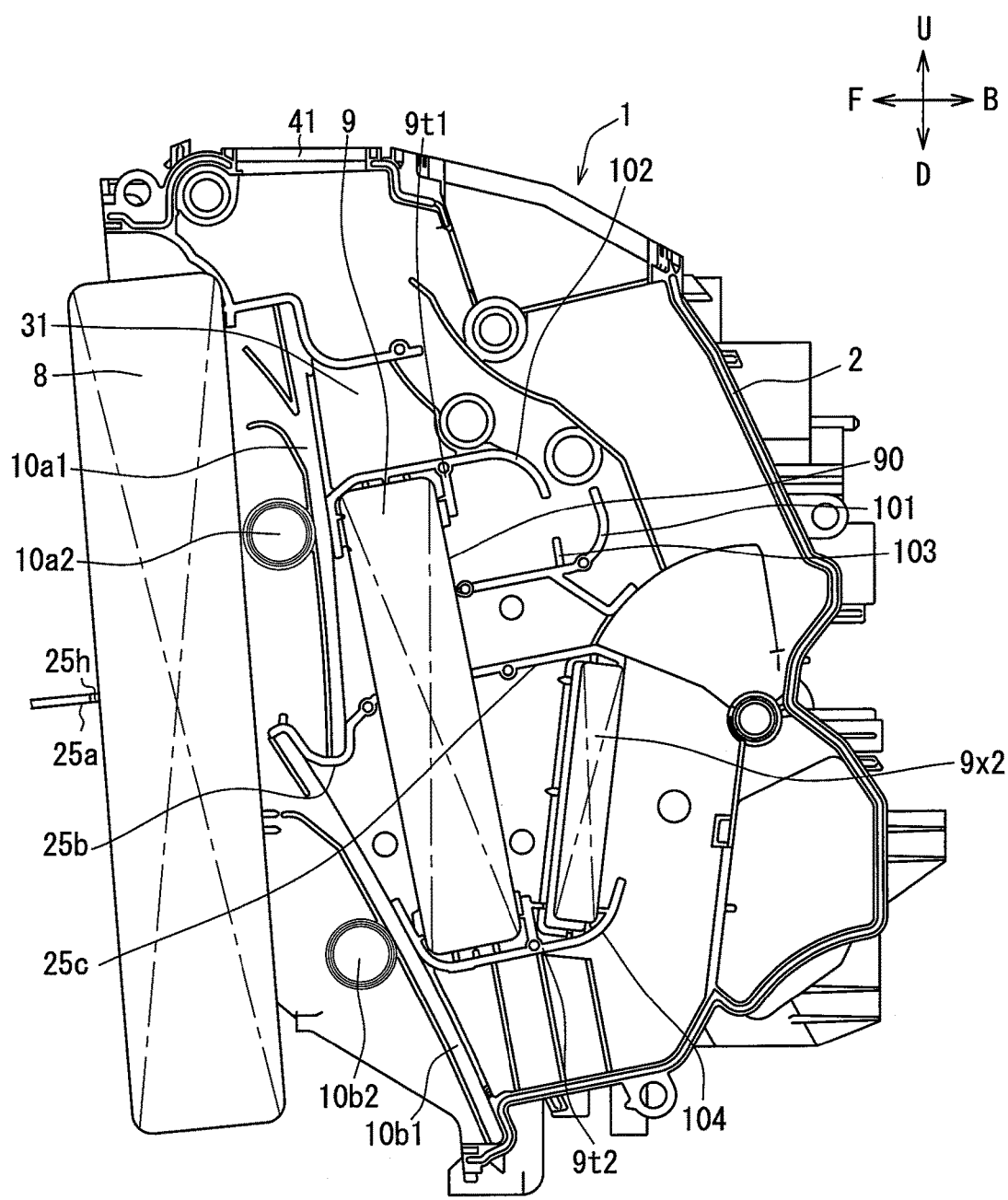
FIG. 7 is a schematic view showing a part of an air conditioning unit of an air conditioning device for vehicle according to a third embodiment of the present disclosure.

A third embodiment of the present disclosure will now be described. A description will be given to a portion different from the embodiments described above. FIG. 7 shows the third embodiment of the present disclosure. Referring to FIG. 7, an air conditioning device for vehicle has a partition plate 25 (25a through 25c) that forms an inside and outside air bi-level structure.

A heating sub-heat exchanger 9x2 forming a heat exchanger other than a cooling heat exchanger 8 and a heating heat exchanger 9 is provided below the partition plate 25. An upper end of the heating sub-heat exchangers 9x2 is held on the partition plate 25c and a lower end is held on a lower end guide 104 that bends in an upward direction U. The heating sub-heat exchanger 9x2 is formed of an electric heater or a condenser that forms a heat pump cycle.

While the embodiments above have been described as preferred embodiments of the present disclosure, the present disclosure is not limited to the embodiments above and can be implemented in various modifications within the scope of the present disclosure. The structures of the embodiments above are mere examples and the scope of the present disclosure is by no means limited to the scope of the above description.

In the embodiments above, sliding doors are used as the air mixing doors 10 that adjust an air volume ratio between hot air passing through the heating heat exchanger 9 and cold air bypassing the heating exchanger 9 as the adjustment device of outlet air temperature. However, a plate-like door that pivots about an axis may be used as the air mixing doors 10.

The present disclosure is applied to the air conditioning device for vehicle having the inside and outside air bi-level structure. However, the inside and outside air bi-level structure is a mere example and is not an essential structure. Further, three plate-like doors are used as the outlet mode doors in the embodiments above. However, a single film-like outlet mode door having multiple openings may be used instead of the three plate-like doors.

What is claimed is:

1. An air conditioning device for a vehicle, comprising:
a cooling heat exchanger that cools an inside air which is an air inside a vehicle compartment and an outside air which is an air outside the vehicle compartment;
a heating heat exchanger that is disposed downstream of the cooling heat exchanger in an airflow direction;
an air mixing door that is disposed between the cooling heat exchanger and the heating heat exchanger and adjusts a degree of heating of a cold air in the heating heat exchanger by controlling a flow of the cold air that has passed through the cooling heat exchanger;
an outlet from which an air adjusted in temperature by the air mixing door is blown out to the vehicle compartment;
an airflow regulation wall that is disposed downstream of the heating heat exchanger in the airflow direction and introduces an air that has flowed out of the heating heat exchanger to the outlet;
a first path along which the cold air that has flowed out of the cooling heat exchanger reaches the outlet with passing through an interior of the heating heat exchanger according to the control of airflow by the air mixing door; and
a second path along which the cold air that has flowed out of the cooling heat exchanger reaches the outlet from above the heating heat exchanger without passing through the interior of the heating heat exchanger according to the control of a flow of air by the air mixing door, wherein
the airflow regulation wall includes guide plates that guide a flow of air on a downstream side of the heating heat exchanger,
the guide plates include:
a first guide that extends from a downstream wall surface of the heating heat exchanger to a downstream side in the airflow direction and bends to extend in an upward direction so as to guide an air to the outlet by letting the air flow in the upward direction from the downstream side of the heating heat exchanger along the first path;
a second guide that extends from an upper end part of the heating heat exchanger to the downstream side in the airflow direction and bends to extend in a downward direction; and
a third guide that extends from the first guide toward an end of the second guide, and
a distance between an end of the first guide and the downstream wall surface of the heating heat exchanger is longer than a distance between the end of the second guide and the downstream wall surface of the heating heat exchanger.

2. The air conditioning device for a vehicle, according to claim 1, wherein when a dimension from an end of the third guide to the end of the second guide is defined as a dimension A, and when a dimension from the end of the first guide to the end of the second guide is defined as a dimension B, the dimension A is set in a range 0.7 to 1.3 times longer than the dimension B.

3. The air conditioning device for a vehicle, according to claim 1, wherein when a dimension from an end of the third guide to the end of the second guide is defined as a dimension A, and when a dimension from the end of the first guide to the end of the second guide is defined as a dimension B, a relation of the dimension A and the dimension B is expressed as: B≤A.

4. The air conditioning device for a vehicle, according to claim 1, further comprising a partition plate that is provided downstream of the cooling heat exchanger in the airflow direction and splits air flowing into the heating heat exchanger into an upper air and a lower air flowing below the upper air, wherein
the first guide is disposed between the partition plate and the second guide in the upward direction.

5. The air conditioning device for a vehicle, according to claim 4, having an inside and outside air bi-level structure in which the upper air flowing above the partition plate is the outside air and the lower air flowing below the partition plate is the inside air.

6. The air conditioning device for a vehicle, according to claim 1, wherein
the cooling heat exchanger configures an evaporator that absorbs heat by letting a refrigerant evaporate, and
the heating heat exchanger configures one of a heater core in which an engine coolant flows, an electric heater that generates heat when a current is passed therethrough, and a condenser that generates heat due to condensation of a refrigerant.

7. The air conditioning device for a vehicle, according to claim 1, wherein the third guide extends toward the end of the second guide from a base portion of the first guide that extends to the downstream side in the airflow direction.

8. An air conditioning device for a vehicle, comprising:
a cooling heat exchanger that cools an inside air which is an air inside a vehicle compartment and an outside air which is an air outside the vehicle compartment;
a heating heat exchanger that is disposed downstream of the cooling heat exchanger in an airflow direction;
an air mixing door that is disposed between the cooling heat exchanger and the heating heat exchanger and adjusts a degree of heating of a cold air in the heating heat exchanger by controlling a flow of the cold air that has passed through the cooling heat exchanger;
an outlet from which an air adjusted in temperature by the air mixing door is blown out to the vehicle compartment;
an airflow regulation wall that is disposed downstream of the heating heat exchanger in the airflow direction and introduces an air that has flowed out of the heating heat exchanger to the outlet;
a first path along which the cold air that has flowed out of the cooling heat exchanger reaches the outlet with passing through an interior of the heating heat exchanger according to the control of airflow by the air mixing door;
a second path along which the cold air that has flowed out of the cooling heat exchanger reaches the outlet from above the heating heat exchanger without passing through the interior of the heating heat exchanger according to the control of a flow of air by the air mixing door; and
a direction changing portion that changes a flow direction of the cold air in the second path from a direction toward the heating heat exchanger in the first path to a direction toward the outlet, wherein
the airflow regulation wall has guide plates that guide a flow of air on a downstream side of the heating heat exchanger,
the guide plates include:
a first guide that extends from a downstream wall surface of the heating heat exchanger to a downstream side in the airflow direction and bends to extend in an upward direction so as to guide an air to the outlet by letting the air flow in the upward direction from the downstream side of the heating heat exchanger along the first path;
a second guide that extends from an upper end part of the heating heat exchanger to the downstream side in the airflow direction and bends to extend in a downward direction; and
a third guide that extends from the first guide toward an end of the second guide,
a distance between an end of the first guide and the downstream wall surface of the heating heat exchanger is longer than a distance between the end of the second guide and the downstream wall surface of the heating heat exchanger,
the direction changing portion is formed of the first guide and the third guide and includes a space defined by the first guide and the third guide, and
the direction changing portion changes the flow direction of the cold air that has flowed into the space from the second path along the second guide to toward the outlet.

9. The air conditioning device for a vehicle according to claim 8, wherein the space of the direction changing portion is positioned between a part of the first guide that extends in the upward direction and the third guide.

* * * * *